United States Patent
Neuwirth

(10) Patent No.: US 10,235,672 B2
(45) Date of Patent: Mar. 19, 2019

(54) SECURELY RECEIVING FROM A REMOTE USER SENSITIVE INFORMATION AND AUTHORIZATION TO PERFORM A TRANSACTION USING THE SENSITIVE INFORMATION

(71) Applicant: Volker Neuwirth, Eden, UT (US)

(72) Inventor: Volker Neuwirth, Eden, UT (US)

(73) Assignee: Zukunftware, LLC, Eden, UT (US)

( * ) Notice: Subject to any disclaimer, the term of this patent is extended or adjusted under 35 U.S.C. 154(b) by 1173 days.

(21) Appl. No.: 14/080,292

(22) Filed: Nov. 14, 2013

(65) Prior Publication Data
US 2014/0164241 A1 Jun. 12, 2014

Related U.S. Application Data

(63) Continuation-in-part of application No. 13/731,879, filed on Dec. 31, 2012, now Pat. No. 9,799,029, and
(Continued)

(51) Int. Cl.
*G06Q 20/40* (2012.01)
*G06Q 20/32* (2012.01)
(Continued)

(52) U.S. Cl.
CPC ........... *G06Q 20/401* (2013.01); *G06Q 20/12* (2013.01); *G06Q 20/322* (2013.01); *G06Q 20/3825* (2013.01)

(58) Field of Classification Search
CPC ........ G06Q 20/40; G06Q 20/32; G06Q 20/12; G06Q 20/38
(Continued)

(56) References Cited

U.S. PATENT DOCUMENTS 6,018,724 A * 1/2000 Arent .................... G06F 21/645
705/39
6,091,835 A 7/2000 Smithies
(Continued)

OTHER PUBLICATIONS

"Riivari, Jukka, "Mobile banking: A powerful new marketing and CRM tool for financial services companies all over Europe", Sep. 2005, Journal of Financial Services Marketing 10, p. 11" (Year: 2005).*
(Continued)

*Primary Examiner* — Eric T Wong
*Assistant Examiner* — Kevin T Poe
(74) *Attorney, Agent, or Firm* — Kirton McConkie; Brian Tucker

(57) ABSTRACT

Payment information and user input to serve as authorization to perform a transaction using the payment information can be obtained from a remote user having a client computing device. A merchant can send a request for payment information and authorization over a network to any device having a browser and touch screen or other means for receiving user input. A user interface having overlaid fields can be used to receive the payment information in a secure manner that prevents the payment information from being stored on the client computing device. An input area can also be displayed within the browser on the user's device. When the user inputs a signature (or other authorization information) into the input area, the signature can be routed over a network back to the merchant to provide authorization for a transaction.

21 Claims, 20 Drawing Sheets

Related U.S. Application Data a continuation-in-part of application No. 14/012,005, filed on Aug. 28, 2013, which is a continuation-in-part of application No. 13/731,942, filed on Dec. 31, 2012.

(60) Provisional application No. 61/700,250, filed on Sep. 12, 2012.

(51) Int. Cl.
*G06Q 20/12* (2012.01)
*G06Q 20/38* (2012.01)

(58) Field of Classification Search
USPC .......................................................... 705/44
See application file for complete search history.

(56) References Cited

U.S. PATENT DOCUMENTS

| | | | |
|---|---|---|---|
| 6,304,915 | B1 | 10/2001 | Nguyen et al. |
| 7,934,098 | B1 | 4/2011 | Hahn |
| 2002/0156685 | A1 | 10/2002 | Ehrlich et al. |
| 2003/0138135 | A1 | 7/2003 | Chung et al. |
| 2004/0010634 | A1* | 1/2004 | Takashima .................... 710/1 |
| 2005/0246263 | A1* | 11/2005 | Ogg .................... G06Q 40/04 |
| | | | 705/37 |
| 2006/0167746 | A1* | 7/2006 | Zucker ............................. 705/14 |
| 2006/0212407 | A1 | 9/2006 | Lyon |
| 2007/0022053 | A1 | 1/2007 | Waserstein et al. |
| 2007/0078797 | A1 | 4/2007 | Won |
| 2008/0065546 | A1 | 3/2008 | Ramachandran |
| 2008/0078831 | A1* | 4/2008 | Johnson ................. G06Q 20/10 |
| | | | 235/380 |
| 2008/0086425 | A1* | 4/2008 | Ruggiero et al. ............... 705/67 |
| 2011/0093777 | A1 | 4/2011 | Dunn |
| 2012/0005038 | A1* | 1/2012 | Soman .................... G06Q 20/12 |
| | | | 705/26.41 |
| 2012/0011066 | A1 | 1/2012 | Telle et al. |
| 2012/0078791 | A1 | 3/2012 | Huang et al. |
| 2012/0173431 | A1* | 7/2012 | Ritchie et al. ................... 705/65 |
| 2012/0221470 | A1 | 8/2012 | Lyon |
| 2012/0239417 | A1* | 9/2012 | Pourfallah ............. G06Q 50/22 |
| | | | 705/2 |
| 2012/0253978 | A1 | 10/2012 | Bishop et al. |
| 2012/0311706 | A1 | 12/2012 | Newman |
| 2013/0132274 | A1 | 5/2013 | Henderson et al. |
| 2014/0012757 | A1 | 1/2014 | Henderson et al. |

OTHER PUBLICATIONS

Kang Inwon, Lee Kun Chang, Kim Sang-Man, Lee Jiwon, "THe effect of trust transference in multi-banking channels;, offline, online and mobile", International Journal of Mobile Communications vol. 9, No. 2, 2011, p. 103 (Year: 2011).*
"Sumanjeet, Singh, "Emergence of Payment Systems in the Age of Electronic Commerce: The State of Art", Asia Pacific Journal of Finance and Banking Research vol. 3 No. 3 2009" (Year: 2009).*
International Search Report for WO/2014/042911 (PCT/US13/57859) dated Mar. 6, 2014.
International Search Report for WO/2014/105702 (PCT/US13/76939) dated Mar. 13, 2014.
International Preliminary Report on Patentability for WO/2014/042911 (PCT/US13/57859) dated Sep. 12, 2014.

* cited by examiner

800 http://somewebsite.com

First Name: ____  Last Name: ____

Routing #: ____  Account #: ____  } 801
Check #: ____  Type: Savings ○ Checking ○

Amount: ____

802 — Mobile #: ____   803 — Email: ____

804 — [Request Signature]

800 http://somewebsite.com

First Name: [         ]  Last Name: [         ]

Routing #: [         ]  Account #: [         ]  } 801

Check #: [         ]  Type: Savings ◎ Checking ◎

Amount: [         ]

802 ↘  Mobile #: [         ]   803 ↘ Email: [         ]

804 ~ [Request Signature]

John Doe                              1001
123 N Street            DATE_____
City, State 12345
Pay                              $ [    ]  ← 1101
TO THE ORDER OF
For _____
  123456789  000123456789  1001

1102 → [Process eCheck]

*FIG. 11*

800 http://somewebsite.com

First Name: [ ]  Last Name: [ ]  } 801

CC #: [ ]  Expiration: [ ]
CCV2 #: [ ]

Amount: [ ]

802
Mobile #: [ ]  803  Email: [ ]

1201

804  Request Signature

Company A
12/31/2012  12:41 PM

For: ...

TOTAL  $60.64

*AMEX*
XXXX XXXX XXXX 7890
12/12

Signature

Process Credit Card

800 http://somewebsite.com

First Name: _____  Last Name: _____

Routing #: _____  Account #: _____  } 801
Check #: _____  Type:  Savings ◉  Checking ◉

Amount: _____

802 ⌐  803 ⌐
Mobile #: _____  Email: _____

804 — [Request Signature]

John Doe
123 N Street
City, State 12345                               DATE _____      1001

Pay _____ $ [____]  — 1101
TO THE ORDER OF

For _____                    *John Doe*
  123456789  000123456789  1001
                                              — 1102
                                          [Process eCheck]

*FIG. 13*

800 http://somewebsite.com

First Name: ☐  Last Name: ☐

CC #: ☐  Expiration: ☐  } 801

CCV2 #: ☐

Amount: ☐

802 — Mobile #: ☐   803 — Email: ☐

1201

804 — [Request Signature]

Company A
12/31/2012   12:41 PM
For: ...
TOTAL          $60.64
*AMEX*
XXXX XXXX XXXX 7890
12/12
Signature
*John Doe*

[Process Credit Card] — 1202

*FIG. 14*

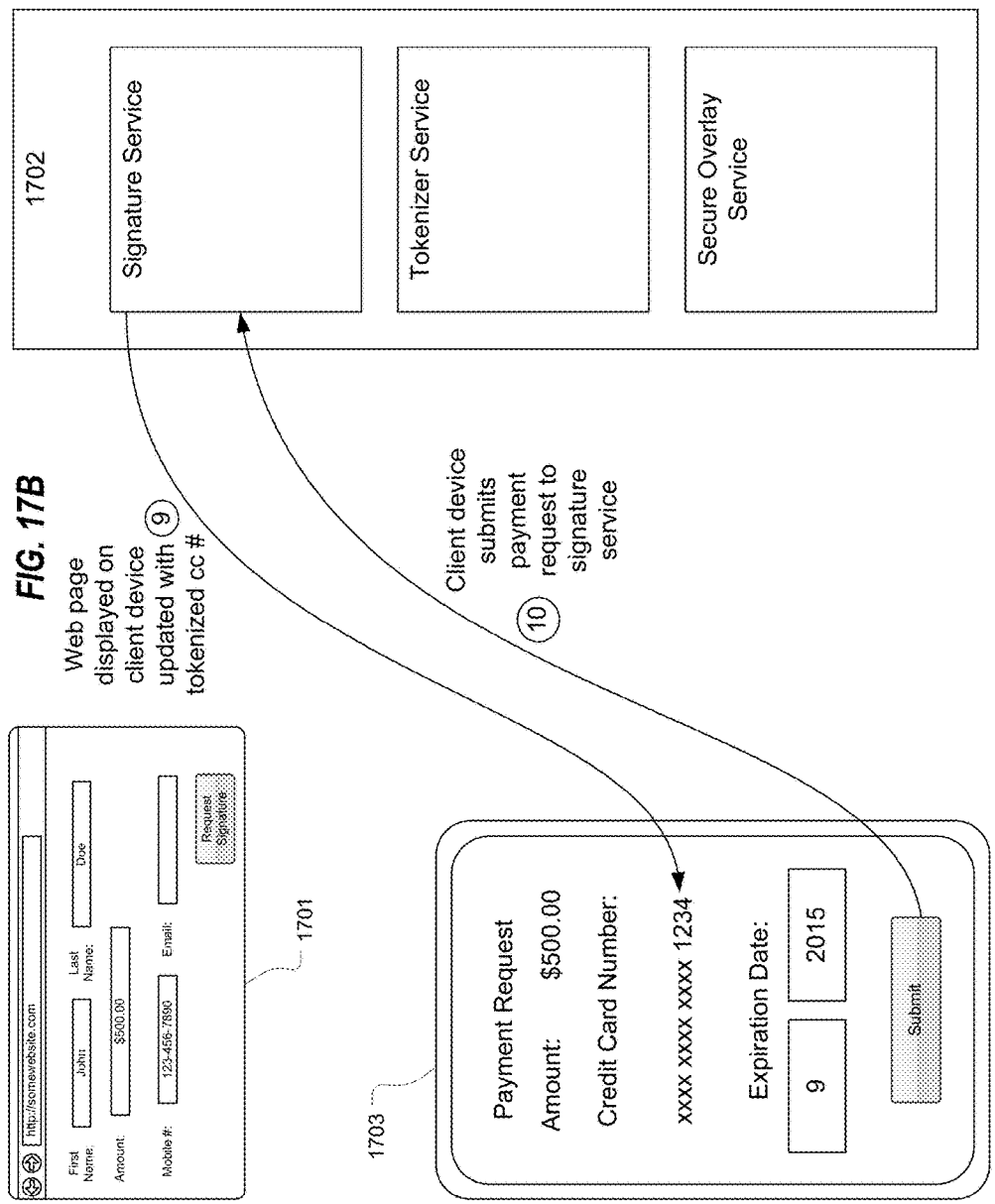

SECURELY RECEIVING FROM A REMOTE USER SENSITIVE INFORMATION AND AUTHORIZATION TO PERFORM A TRANSACTION USING THE SENSITIVE INFORMATION

CROSS-REFERENCE TO RELATED APPLICATIONS

This application is a continuation-in-part of U.S. patent application Ser. No. 13/731,879 which was filed on Dec. 31, 2012.

This application is also a continuation-in-part of U.S. patent application Ser. No. 14/012,005 filed on Aug. 28, 2013 which is a continuation-in-part of U.S. patent application Ser. No. 13/731,942 filed on Dec. 31, 2012 which claims the benefit of U.S. Provisional Patent Application No. 61/700,250 filed on Sep. 12, 2012.

BACKGROUND

The Payment Card Industry Data Security Standard (PCI DSS) defines standards for ensuring the protection of cardholder data in computer transactions. These standards apply to all entities that store, process, or transmit cardholder data. For example, a merchant that accepts or processes payment cards must comply with the PCI DSS. The primary goal of the PCI DSS is to protect cardholder data wherever it is processed, stored, or transmitted.

One portion of the PCI DSS, known as the Payment Application DSS (PA DSS), defines standards for third party payment software applications. For example, the PA DSS would govern an application that receives user input of a credit card number or other payment information on a computing device. The PA DSS requires compliance when cardholder data (e.g. primary account number, cardholder name, expiration date, service code, PIN, magnetic strip data, etc.) is stored, processed, or transmitted by the application.

To comply with the PA DSS, applications that receive, store, or transmit cardholder data must be configured to perform various functions (e.g. encryption) on the cardholder data. Performing these functions requires substantial computing resources. Many computing devices have sufficient resources to adequately support such applications.

However, some computing devices, such as mobile devices, either have limited computing resources or lack other security features that make it much more difficult to provide a PA DSS compliant application on such devices. For example, although many smart phones/apps can be configured to accept payment information in a PA DSS compliant manner, it is difficult, costly, and relatively less secure to do so. For this reason, relatively few mobile applications/platforms are certified as PA DSS compliant.

To address this issue, one workaround is being commonly implemented. Mobile applications such as Square (provided by Square, Inc.) or GoPayment (provided by Intuit, Inc.) use a mobile card reader (which is generally plugged in to the earphone jack) that scans a payment card and encrypts the cardholder data before transmitting it to the mobile phone. Because the cardholder data is encrypted before it is transferred to the phone, and therefore never stored on the phone in an unencrypted format, the application running on the phone does not need to comply with the PA DSS. This approach works, but is often less desirable because it requires a separate card reader and requires that a card be physically scanned.

Mobile devices enable users to perform transactions in virtually any location. For example, using a smart phone, a user can make online purchases or purchases over the phone from any remote location having an appropriate connection. In many transactions, the user's authorization to enter into a transaction can be received over the phone or by clicking a checkbox in a webpage.

In spite of the mobility provided by such devices, many transactions still cannot be performed by a remote user. Some transactions (e.g. recurring payments) often cannot be completed without receiving a signature from the user. For this reason, to authorize some transactions, remote users are required to mail or fax a signed paper to the entity performing the transaction. Examples of transactions that require a user's signature include authorization to make recurring debits from the user's account for repaying a loan or authorization to make recurring charges to a user's credit card for a subscription service.

Printing, signing, and returning a document can be a burdensome requirement for many users. Accordingly, when a signature is required for authorizing a transaction remotely, users are not able to fully benefit from the mobility provided by their portable devices.

BRIEF SUMMARY

The present invention extends to systems, methods, and computer program products for securely receiving data input at a computing device without storing the data locally. The invention allows an application, such as a mobile app or browser, to receive payment information (e.g. credit card information) directly from a user without requiring the application to comply with the PA DSS or another standard. The application can employ any type of user interface for receiving user input as well as one or more overlaid input fields that receive sensitive payment information. The overlaid input fields can be part of a web page or other interface that can securely submit data to a remote computer system (e.g. a server) where it can be stored, processed, or transmitted in accordance with the PCI DSS or another standard. In this way, the sensitive payment information is not stored, processed, or transmitted by the application on the local device.

The present invention can be used in combination with methods for receiving a signature (or other type of verification or confirmation) from a remote user to authorize a transaction. The present invention enables a merchant to send a signature request over a network to any device having a browser and touch screen or other means for receiving user input. An input area is displayed within the browser on the user's device. When the user inputs a signature, the signature can be routed over a network back to the merchant to provide authorization for a transaction.

The present invention can therefore combine overlaid input fields and a signature input area into a user interface to allow the user to both input payment information (e.g. credit card or bank account information) and input a signature to authorize a transaction using the payment information. The input of this information can be provided as part of a single seamless process to enable virtually any remote user having a computing device to authorize a transaction in a secure manner.

In one embodiment, the present invention provides a method for providing a request for sensitive information and authorization to perform a transaction using the sensitive information to a client computing device over a network. A first request is received from a merchant computing system.

The first request requests that a second request for sensitive information and user input to serve as authorization to perform a transaction using the sensitive information be sent to a client computing device. The first request includes contact information for a user of the client computing device. The second request is generated and includes user interface code for rendering one or more user interfaces on the client computing device. The one or more user interfaces include one or more overlaid fields for receiving sensitive information from the user of the client computing device and one or more fields for receiving the user input to serve as authorization. The second request is sent to the client computing device using the contact information. The sensitive information and the user input are received from the client computing device. A transaction is then caused to be performed using the sensitive information with the user input serving as evidence that the user has authorized the transaction.

In another embodiment, the present invention is implemented as a method for providing a request for payment information and authorization to perform a transaction using the payment information to a client computing device over a network. Contact information for a user of a client computing device is received from a merchant computing system. A webpage that contains a request for payment information is sent to the client computing device using the contact information. A request to send one or more overlaid fields to be displayed overtop the webpage when the webpage is displayed on the client computing device is sent to a service operating in a secure environment. Tokenized payment information is received from the service. A webpage that contains a request for authorization input to authorize a transaction using the payment information is sent to the client computing device. The authorization input is received from the client computing device. The tokenized payment information and the authorization input are then sent to the merchant computing system.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 8 illustrates an exemplary user interface that can be displayed by a merchant computing system to allow a signature to be requested from a remote user;

FIG. 11 illustrates the user interface of FIG. 8 after it has been updated to include an image of a check;

FIG. 12 illustrates the user interface of FIG. 8 after it has been updated to include an image of a credit card receipt;

FIG. 13 illustrates the user interface of FIG. 11 after a signature has been received;

FIG. 14 illustrates the user interface of FIG. 11 after a signature has been received;

FIGS. 17A-17C illustrate a flow diagram of an example process for obtaining payment information and authorization input from a client computing device.

DETAILED DESCRIPTION

Figure 1:
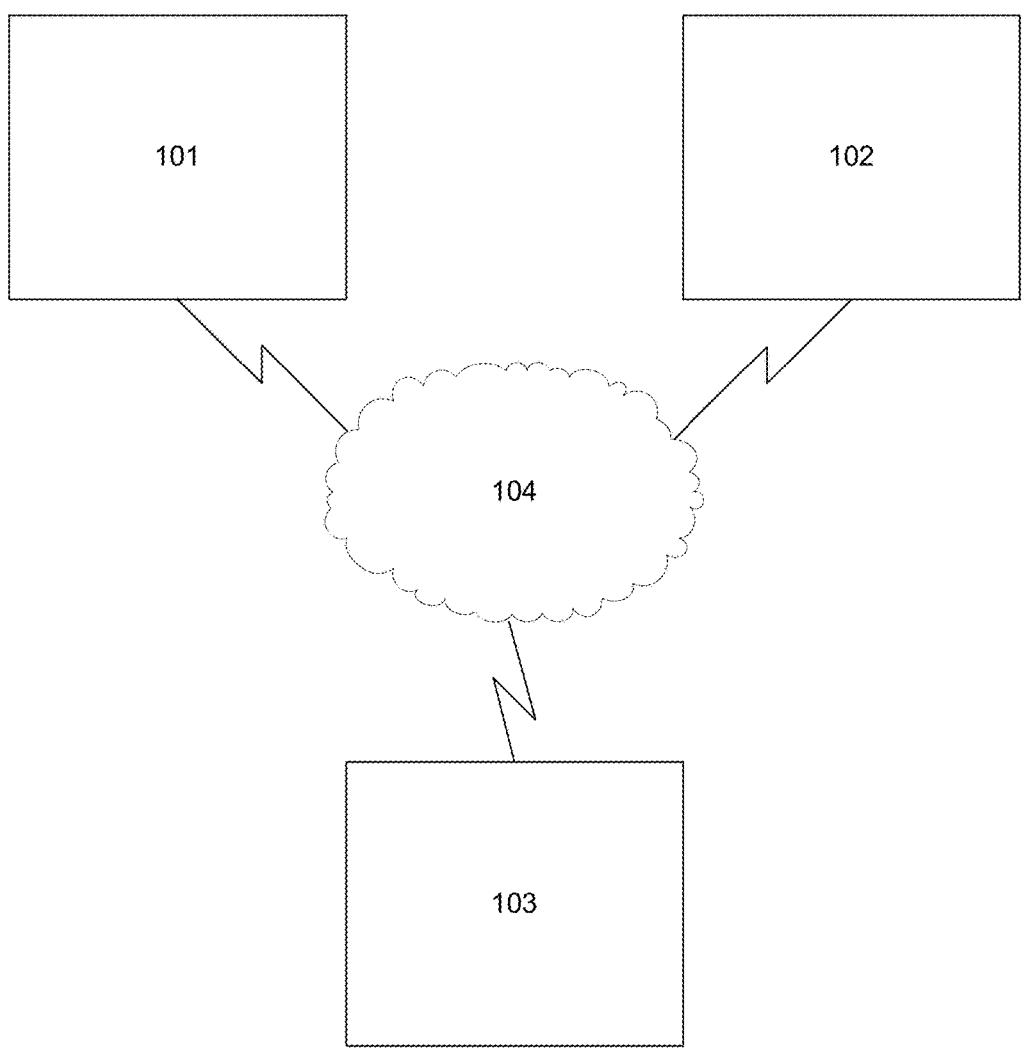
FIG. 1 illustrates an exemplary computer environment in which the present invention can be implemented.

The present invention extends to systems, methods, and computer program products for securely receiving data input at a computing device without storing the data locally. The invention allows an application, such as a mobile app or browser, to receive payment information (e.g. credit card information) directly from a user without requiring the application to comply with the PA DSS or another standard. The application can employ any type of user interface for receiving user input as well as one or more overlaid input fields that receive sensitive payment information. The overlaid input fields can be part of a web page or other interface that can securely submit data to a remote computer system (e.g. a server) where it can be stored, processed, or transmitted in accordance with the PCI DSS or another standard. In this way, the sensitive payment information is not stored, processed, or transmitted by the application on the local device.

The present invention can be used in combination with methods for receiving a signature (or other type of verification or confirmation) from a remote user to authorize a transaction. The present invention enables a merchant to send a signature request over a network to any device having a browser and touch screen or other means for receiving user input. An input area is displayed within the browser on the user's device. When the user inputs a signature, the signature can be routed over a network back to the merchant to provide authorization for a transaction.

The present invention can therefore combine overlaid input fields and a signature input area into a user interface to allow the user to both input payment information (e.g. credit card or bank account information) and input a signature to authorize a transaction using the payment information. The input of this information can be provided as part of a single seamless process to enable virtually any remote user having a computing device to authorize a transaction in a secure manner.

In one embodiment, the present invention provides a method for providing a request for sensitive information and authorization to perform a transaction using the sensitive information to a client computing device over a network. A first request is received from a merchant computing system. The first request requests that a second request for sensitive information and user input to serve as authorization to perform a transaction using the sensitive information be sent to a client computing device. The first request includes contact information for a user of the client computing device. The second request is generated and includes user interface code for rendering one or more user interfaces on the client computing device. The one or more user interfaces include one or more overlaid fields for receiving sensitive information from the user of the client computing device and one or more fields for receiving the user input to serve as authorization. The second request is sent to the client computing device using the contact information. The sensitive information and the user input are received from the client computing device. A transaction is then caused to be performed using the sensitive information with the user input serving as evidence that the user has authorized the transaction.

In another embodiment, the present invention is implemented as a method for providing a request for payment information and authorization to perform a transaction using the payment information to a client computing device over a network. Contact information for a user of a client computing device is received from a merchant computing system. A webpage that contains a request for payment information is sent to the client computing device using the contact information. A request to send one or more overlaid fields to be displayed overtop the webpage when the webpage is displayed on the client computing device is sent to a service operating in a secure environment. Tokenized payment information is received from the service. A webpage that contains a request for authorization input to authorize a transaction using the payment information is sent to the client computing device. The authorization input is received from the client computing device. The tokenized payment information and the authorization input are then sent to the merchant computing system.

Example Computer Architecture

Embodiments of the present invention may comprise or utilize a special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In the following description, the present invention will be described primarily using an example of obtaining a signature from a remote user using a touch screen device. However, it is emphasized that the present invention is not limited to obtaining a signature, but can be used to obtain any type of input from a remote user. Further, the description also primarily describes the use of email or text message for sending requests to a client computing device. However, it is also emphasized that any communication format that allows a link to be included in the message content can equally be used as described below.

Example Computer Environment

FIG. 1 illustrates an exemplary computer environment 100 in which the present invention can be implemented. Computer environment 100 includes server system 101, merchant computing system 102, and client computing device 103 which are each connected via a network 104. In a typical implementation, network 104 comprises the internet although other network connections could be used to interconnect any of the systems of computer environment 100. Client computing device 103 represents any device having a browser and a touch screen or other means for receiving a user's signature. For example, client computing device 103 may comprise a smart phone or tablet with a touch screen that allows a user to use his finger to provide a signature. Client computing device 103 could also comprise a desktop or laptop computer without a touchscreen in which case the user can use a mouse or other input device to provide a signature.

Merchant computing system 102 represents one or more servers or other computing devices that a merchant uses to send requests to server system 101 over network 104. These requests can include requests that server system 101 generate and send a signature request to client computing device 103.

Server system 101 represents one or more computing devices used to receive requests from merchant computing system 102, and to send requests for signatures to client computing device 103 and receive signatures back from client computing device 103. Server system 101 can comprise one or more server computing devices or a cloud of server computing systems.

Accordingly, server system 101 acts as an intermediary between merchant computing system 102 and client computing device 103 for requesting and obtaining a signature and/or account information from a user of client computing device 103. Server system 101 can employ any suitable interface for receiving requests from merchant computing system 102. In one particular embodiment, a Simple Object Access Protocol (SOAP) interface can be provided to allow merchants to make requests for signatures and receive signatures using SOAP requests and responses respectively. In this manner, server system 101 can provide a third party tool for obtaining signatures that is easily incorporated into any merchant's business processes.

Although FIG. 1 illustrates that a merchant system uses an intermediary server system to send requests to the client computing device, the invention can also be implemented when the merchant system directly communicates with client computing device. In such cases, merchant system can be configured to perform the functionality described as being performed by the server system in the following description.

The following portions of the description will separately describe two concepts: (1) the use of overlaid input fields to securely receive account information; and (2) obtaining authorization input from a remote user. The description will then conclude with a description of how the present invention combines these two concepts into a single user interface to allow a merchant to obtain account information and authorization to perform a transaction against the account using a single user interface.

Using Overlaid Input Fields to Securely Receive Account Information

Figure 2:
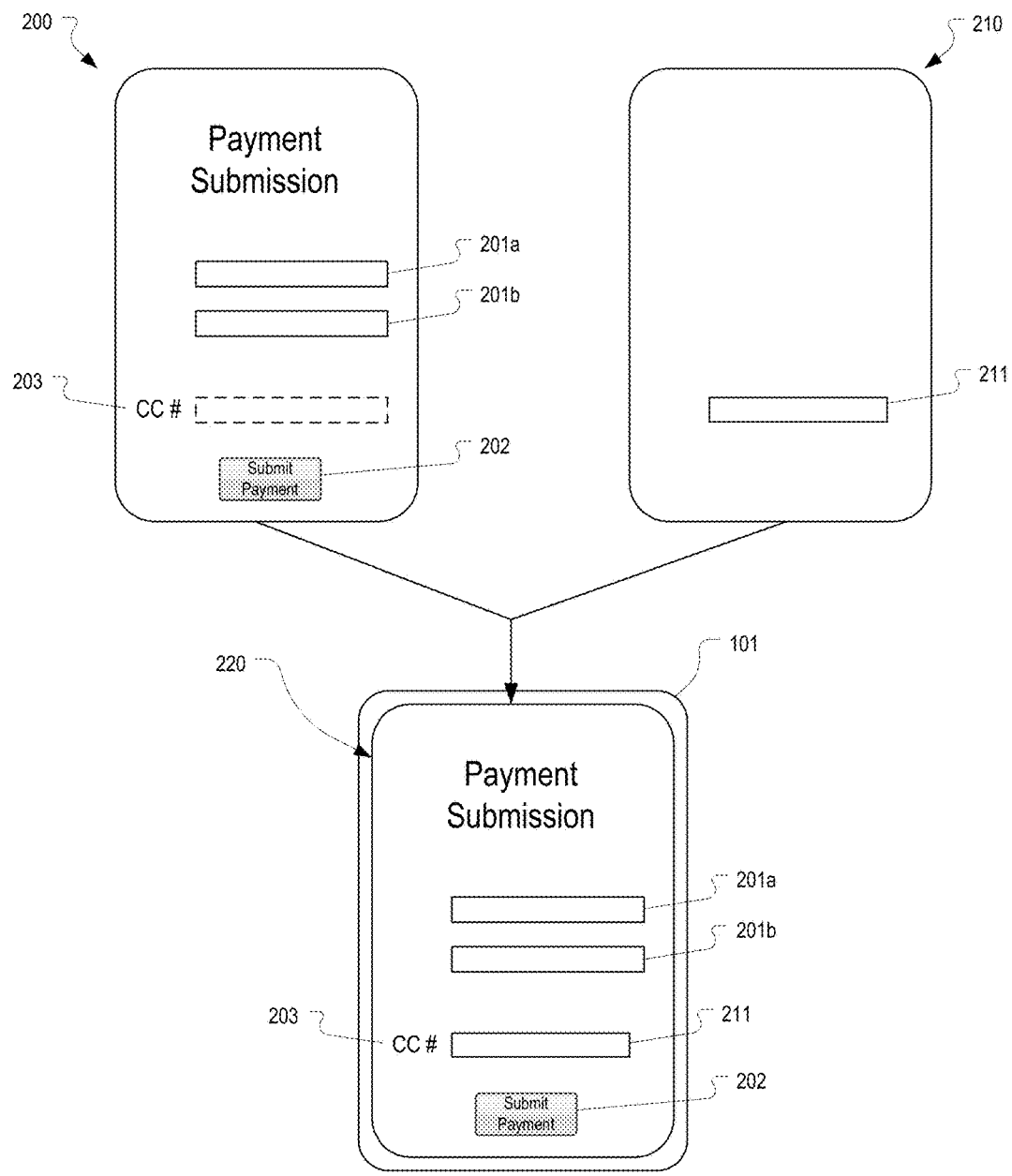
FIG. 2 illustrates how an application can incorporate an overlaid input field for receiving secure input from a user without requiring the secure input to be stored on a computing device.

FIG. 2 illustrates how an application can incorporate an overlaid input field for receiving secure input from a user without requiring the secure input to be stored on client computing device 103. Any type of application including a browser which allows input fields to be overlaid can be used. In FIG. 2, a displayed application user interface 220 for receiving input of a user's credit card number is shown. User interface 220 contains a number of fields 201a, 201b, and 210, text content 203, and submit payment button 202.

User interface 220 is composed of two types of content: typical content 200 and overlaid content 210. The two types of content can be combined in user interface 220 in such a way that the different content is indiscernible to the user. Typical content 200 includes fields 201a and 201b, text content 203, and submit payment button 202. In contrast, overlaid content 210 includes overlaid field 211 which is used to receive input of a credit card number.

Overlaid content 210 can be in the form of a web page that is displayed overtop of the typical content 200 of the application. As such, when the user inputs data into overlaid field 211, the data is not actually input to the application, but is input to the web page. When the data is input into overlaid field 211, the web page can cause the data to be submitted in a secure manner (e.g. via HTTPS) to server system 101. In this way, the data is never stored on client computing device 103, and the application itself does not store, process, or transmit secure data. For this reason, the application does not need to comply with the PA DSS, but still provides a secure, seamless interface for receiving sensitive data.

Figure 3:
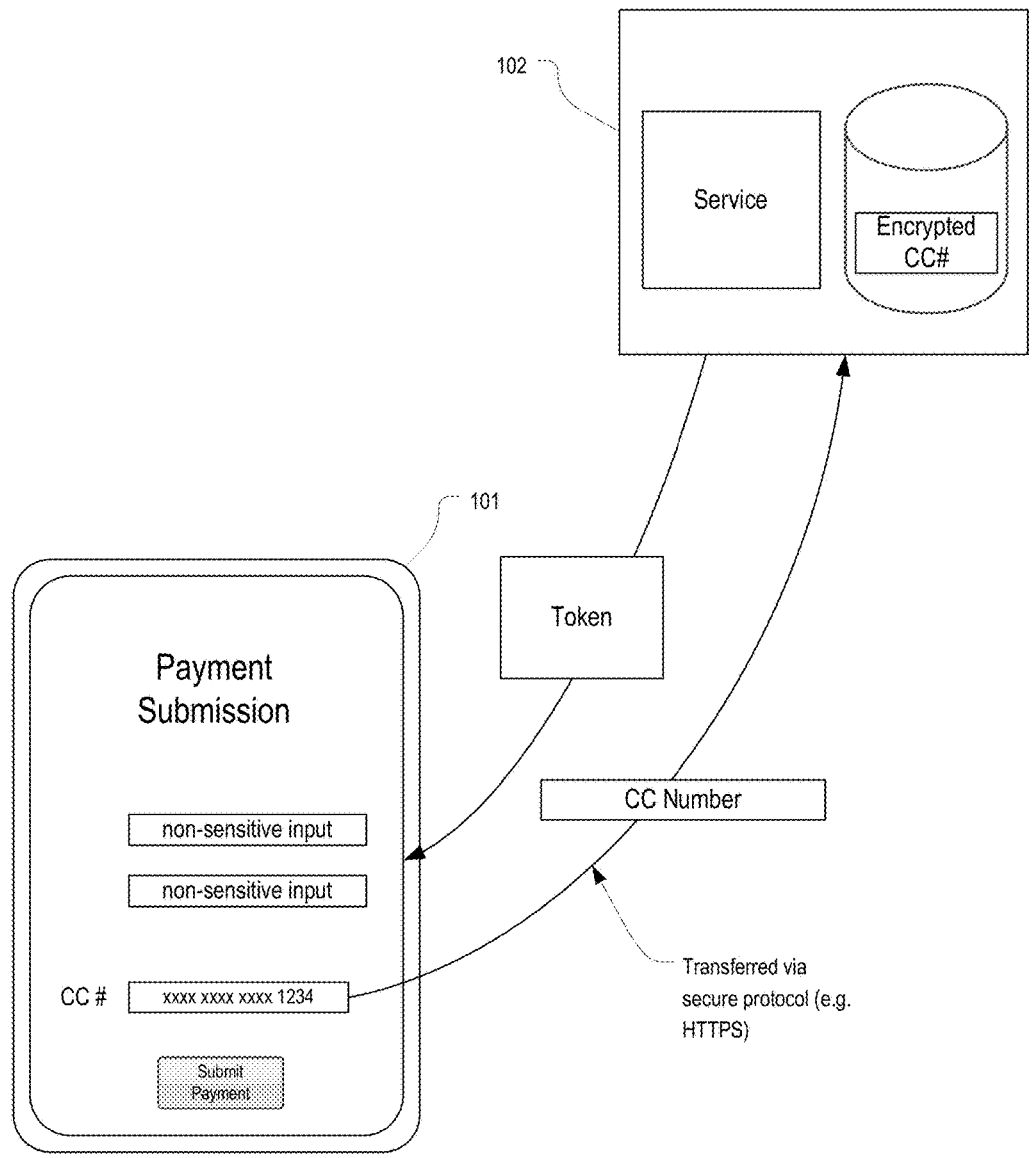
FIGS. 3 and 4 each illustrate various communications between a computing device and a server system when data is input into an overlaid field.

FIG. 3 illustrates various communications between client computing device 103 and server system 101 when data is input into overlaid field 211. As shown, a credit card number has been entered into overlaid field 211. In response, the credit card number is transferred to server system 101 in a secure manner. In a typical implementation, the credit card number can be transferred to server system 101 in a similar manner that credit card information is submitted when entered into a web browser (e.g. using HTTPS which is a recommendation for compliance with the PCI DSS).

To enable the application to subsequently use the credit card number, server system 101 can return a token that represents the credit card number submitted to the server. The token can be any type of data that can be used to identify (or recreate on server system 101) the secure information at a later time. As shown, the credit card number is stored in an encrypted format (e.g. to comply with the PCI DSS) on server system 101. A service on server system 101 (e.g. a SOAP service) creates a token that is returned to client computing device 103. Client computing device 103 can store the token and later submit it back to server system 101 to request use of the credit card number.

In some embodiments, an identifier for the token can also be created and used with the token. For example, the service on server system 101 can generate an identifier (e.g. the last four digits of the credit card number) which can be returned to client computing device 103. The identifier can be maintained to facilitate the use of the token by client computing device 103 and/or server system 101. In some cases, the identifier can be created by client computing device 103 rather than server system 101.

In some embodiments, the token can be independently meaningless, which means that it will appear as useless data if it were accessed while stored on client computing device 103. However, the service on server system 101 can interpret the token within a secure environment to identify the credit card number stored on server system 101. In this way, the token itself has no value to anyone obtaining unauthorized access to it (i.e. the token is not a high-value token).

Further, in some embodiments, to provide greater security, to obtain and use a token, authentication credentials must be provided for a user. For example, in some embodiments, server system 101 will only return a token to client computing device 103 if the user of client computing device 103 has been authenticated (e.g. via username/password) to server system 101. This can be accomplished in various manners such as by requiring the user to log in prior to accessing a user interface that includes overlaid fields. For example, if a mobile application desires to use one or more overlaid fields, the mobile application can be required to submit a user's authentication credentials prior to receiving a webpage containing the overlaid fields. If authentication succeeds, the mobile application can receive and display the webpage overtop of the application's user interface such that the overlaid fields appear as part of the application's user interface.

Because server system 101 can more easily comply with the PCI DSS, this approach facilitates the creation and use of applications on client computing device 103 that do not violate the PA DSS. In other words, the storage, processing, and/or transmission of secure data occurs on server system 101 rather than client computing device 103 so that client computing device 103 does not need to provide the necessary or desired computing resources or security features to comply with the PA DSS.

Although the above description states that a token is stored on the client computing device, in some embodiments, the token can be sent to another system. Because the token can be used to request the processing of a payment, any system desiring to make requests can store the token for subsequent use. In cases where a local application intends to make subsequent processing requests, the token can be stored locally on the client computing device. In contrast, if a third party device (e.g. a merchant computing system) intends to make processing requests, the token can be stored on the third party device.

Figure 4:
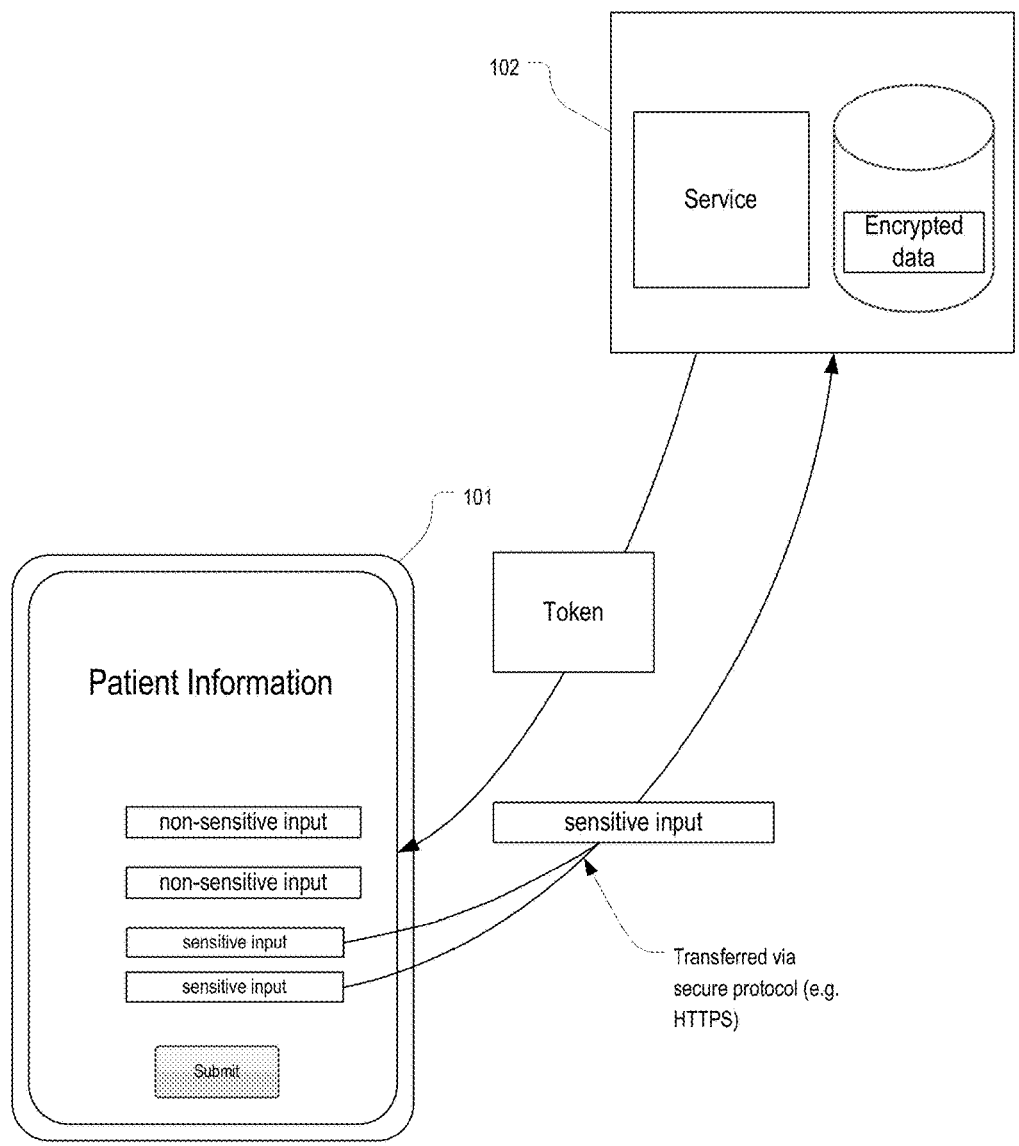

FIG. 4 is similar to FIG. 3 but represents the case where multiple overlaid fields are used to receive multiple sets of secure input. FIG. 4 also represents that the present invention is not limited to receiving payment information, but can be used to securely receive any type of data such as patient information in a health care environment. FIG. 4 shows that a single token is returned when sensitive input from two overlaid fields is submitted. However, depending on the configuration of the service, a token may be created and returned for each field (which may be useful when the input of each field is independently used/referenced).

Figure 5:
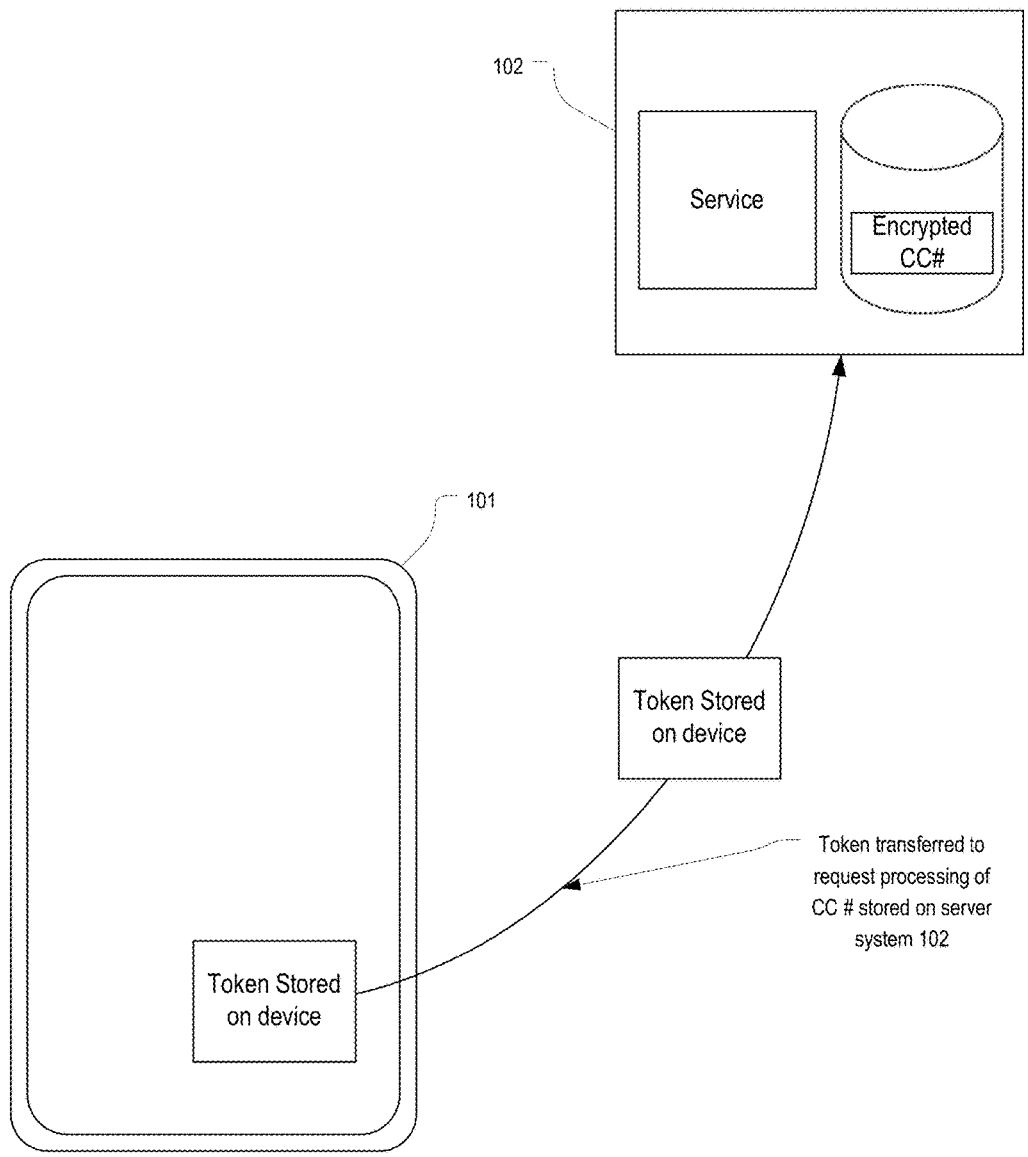
FIG. 5 illustrates how an application on a computing device can use a stored token to request the use of a previously submitted credit card number.

FIG. 5 illustrates how an application on client computing device 103 can use a stored token to request the use of the previously submitted credit card number. As shown, the application stores the token locally so that the associated credit card number can be referenced at a later time. The application on client computing device 103 submits the token (and possibly an associated identifier as described above) to the service on server system 101.

Figure 6:
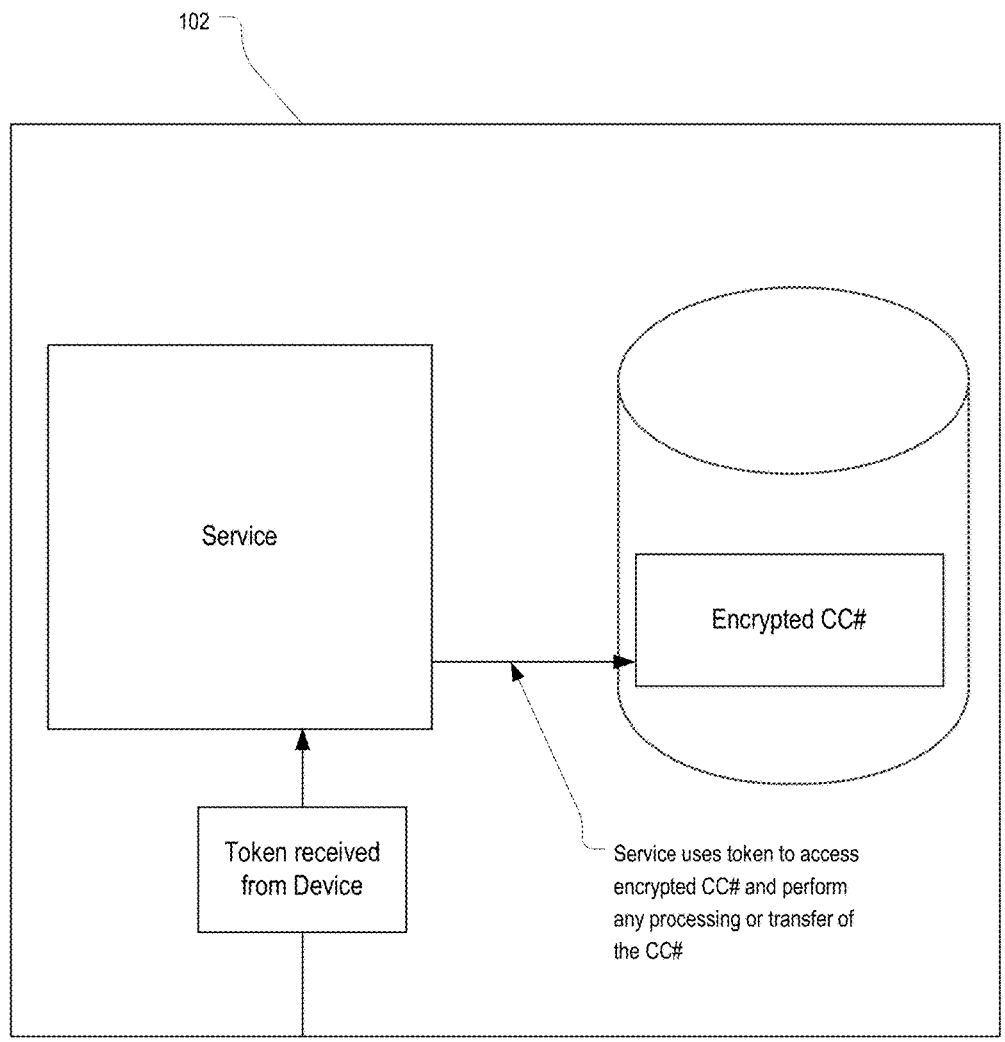
FIG. 6 illustrates how a server system can use a token to access an encrypted credit card number stored on the server system.

As shown in FIG. 6, the service can use the token to access the encrypted credit card number stored on server system 101 and use it as desired. For example, server system 101 can transfer the credit card number to another system, process the credit card number to initiate a charge to the account, etc.

Figure 7:
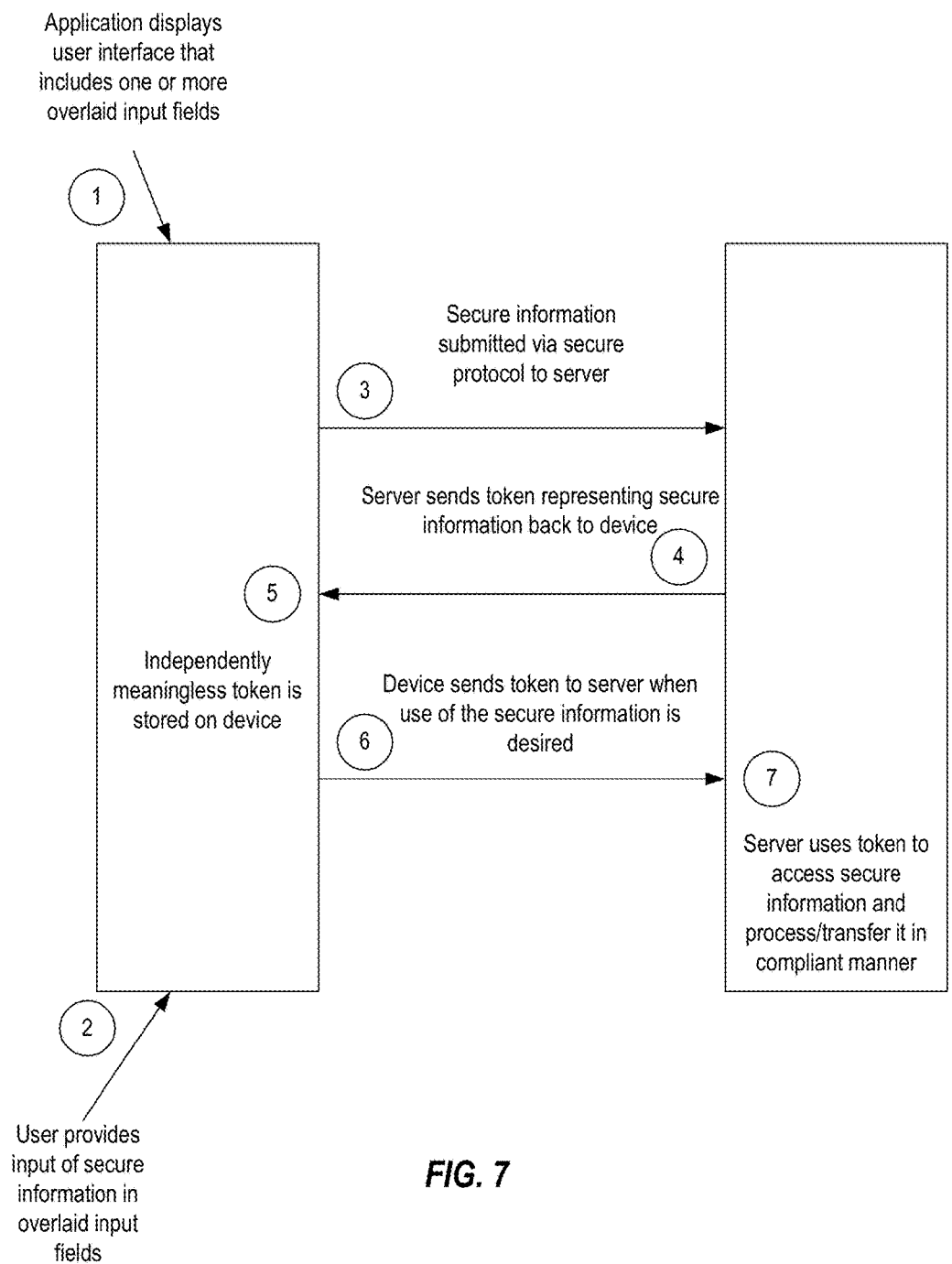
FIG. 7 illustrates a flow diagram that highlights various steps that can be performed when an application employing an overlaid field is used to receive sensitive data from a user.

FIG. 7 provides a flow diagram that highlights various steps that can be performed when an application employing an overlaid field is used to receive sensitive data from a user. In step 1, the application executing on a device displays its user interface that includes one or more overlaid input fields (e.g. in the form of a web page). In step 2, the user provides input into the overlaid fields.

In step 3, the secure data input into the overlaid fields is securely transferred to the server. This can be accomplished using HTTPS or another secure protocol. In step 4, the server sends back a token (or tokens) that represent the secure information. In step 5, the independently meaningless token is stored on the device.

In step 6, the device sends the token to the server requesting that the secure information be used in some manner, such as by requesting that a charge be made to a credit card account associated with a stored credit card number. Finally, in step 7, the server uses the token to identify the secure information and use it in the requested manner.

In some embodiments, the token can be used to auto-populate overlaid fields that are displayed within a user interface on the device or another device. For example, if a user accesses a user interface that employs overlaid fields to request a credit card number, and the device already stores a token representing the user's credit card number, the token can be used (after authentication in some cases) to automatically populate an overlaid input field with the credit card number (or a mask of the credit card number). In other words, the overlaid input fields can be displayed in the same manner as described above, but because the device already stores a token for the requested information, the token can be submitted to the server system and used by the server system to populate the overlaid fields with the necessary information.

Although the above description has used the example of PCI DSS and PA DSS compliance, it is noted that the present invention can be implemented when another or no requirement exists to secure input data. In other words, an application that requests information that is governed by another security standard or that is not governed by any security requirements can still employ the techniques of the invention to secure the information. Examples of other standards for which the present invention can be implemented include the Health Insurance Portability And Accountability Act (HIPAA) standard, the Health Information Technology for Economic and Clinical Health Act (HITECH) standard, and any standard for securing Personally Identifiable Information (PII).

Further, the techniques of the present invention may be more applicable to mobile devices because of their limited resources and lack of security features often provided on personal computers or dedicated computing systems. However, an application on any type of computing device can implement the techniques of the present invention. For example, a desktop application can employ an overlaid field to secure input information in the same manner described.

Obtaining Authorization Input from a Remote User

FIG. 8 illustrates an exemplary user interface 800 that can be displayed by merchant computing system 102 to an employee to allow the employee to request a signature from a remote user of client computing device 103. For example, the employee may be communicating with the user to establish a subscription or other agreement requiring the user to make recurring (e.g. monthly) payments. Such agreements may require a signature from the user to authorize monthly payment, such as in the form of a monthly ACH debit or credit card charge.

Although this example refers to an employee requesting a signature, the merchant computing system 102 can generate requests automatically. Also, the merchant computing system 102 can request signatures from one or many different remote users (i.e. merchant computing system 102 can make batch requests for signatures). For example, merchant computing system 102 can send a batch request to server system 101 requesting signatures or other user input from many different users.

In prior approaches, the user would provide a signature generally by printing, signing, and returning a form via mail or fax. Such approaches are burdensome. The present invention enables a signature to be quickly and easily obtained from a user by employing server system 101.

User interface 800 represents an embodiment where the merchant is attempting to receive a signature to authorize an ACH debit. Accordingly, user interface 800 includes fields 801 for receiving user information including the user's name, a bank routing number, an account number, a check number, an account type, and an amount. Fields 801 are exemplary of information that may be required for an ACH transaction; however, not all information shown is required in all embodiments of the present invention.

User interface 800 also includes fields 802, 803 for receiving a mobile phone number or an email address for the user. The employee can input either or both the user's phone number or email address. Once input, the employee can select request signature button 804 which causes a request to be sent to server system 101 requesting that a signature request be generated and sent to a client computing device. The signature request sent to the client computing device can be in any format capable of including a hyperlink as described below. For example, the signature request can be a text message, an email, an instant message, or a social networking (e.g. Twitter, Facebook, Google+, etc.) message. Some or all of the information input into fields 801 can also be included in the request sent to server system 101.

Although not shown in FIG. 8, user interface 800 can also provide one or more additional fields for receiving other information such as free form text. Any or all of this information can be included in the request sent to server system 101 for subsequent inclusion in a message sent to a client computing device.

As stated above, the request sent to server system 101 can be in the form of a SOAP request. As such, logic for making the request can be easily incorporated into a merchant's existing systems or included in new systems designed to obtain signatures from a remote user.

When server system 101 receives the request from merchant computing system 102, it can generate a message to send to the user in accordance with the information supplied in the request. For example, if the request indicates a mobile phone number, a text message can be generated, whereas if the request indicates an email address or Facebook username, an email or Facebook communication respectively can be generated. The generated message can include any combination of the information provided in the request received from merchant computing system 102 as well as other information provided by server system 101. For example, the generated message can include free form text provided by merchant computing system 102 that can be displayed to the user of client computing device 103.

Figure 9:
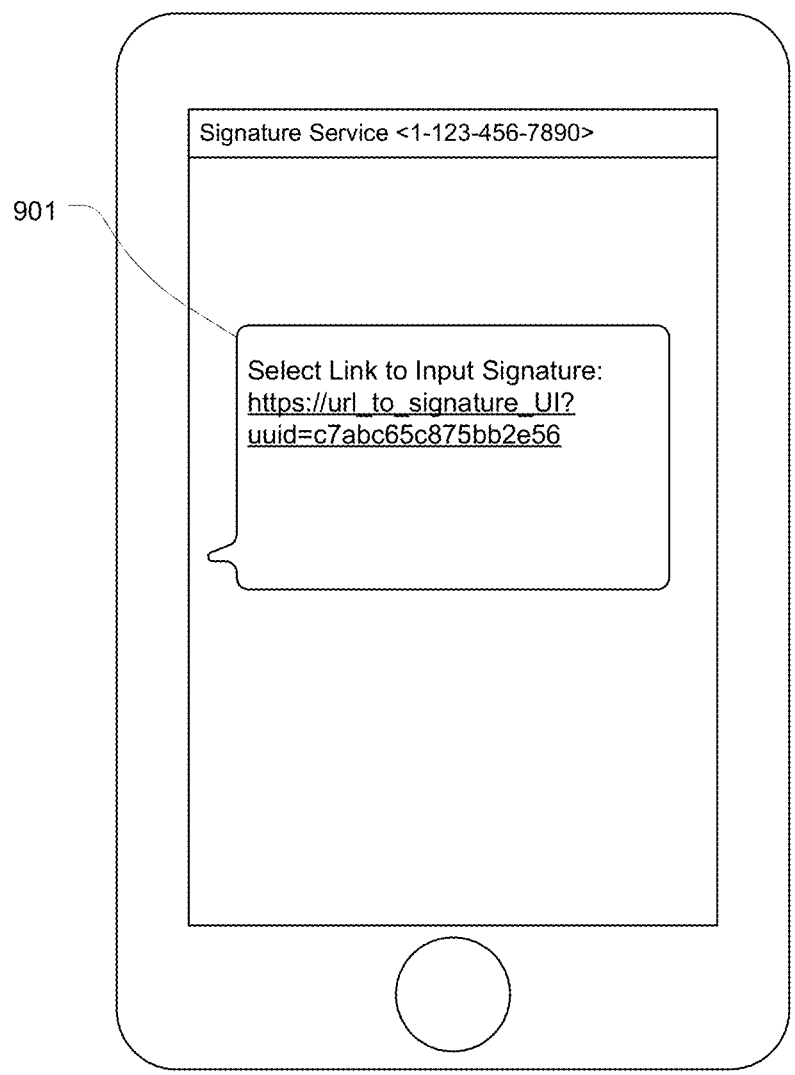
FIG. 9 illustrates an example text message displayed on a smart phone that includes a link to an interface for inputting a signature.

The generated message can include a link to a service for obtaining the signature from the user using client computing device 103. For example, FIG. 9 illustrates an example text message 901 displayed on a smart phone that includes a link that the user can select to receive an interface (e.g. a web page) for inputting a signature. In some embodiments, the message can have an associated expiration time, after which the message can no longer be used to provide a signature (e.g. the link in the message becomes invalid after the expiration time).

Figure 10A:
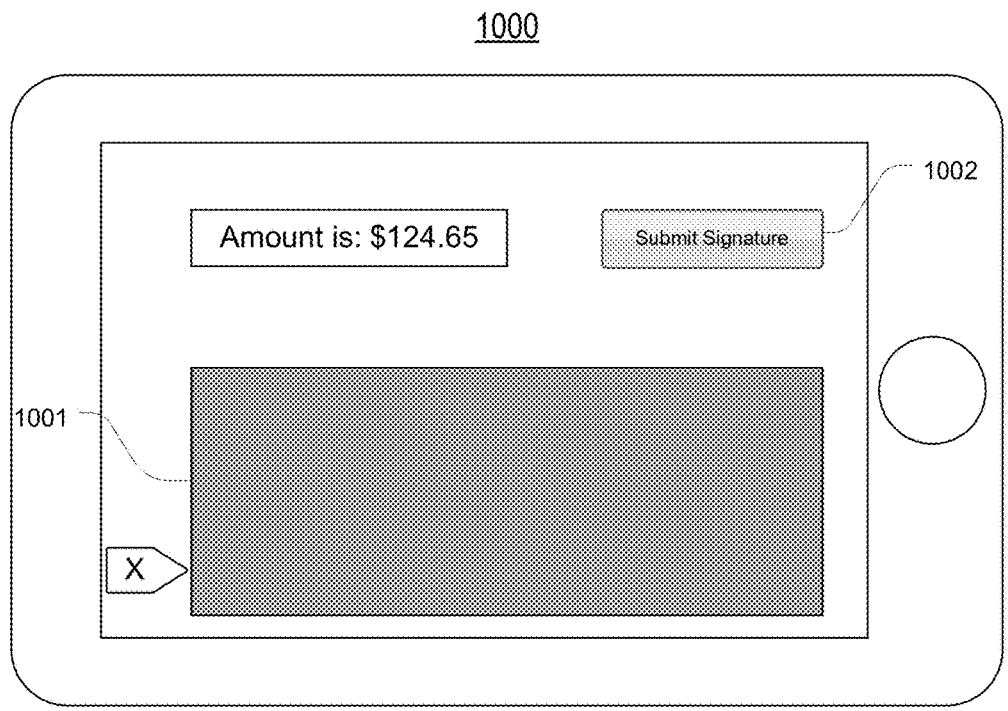
FIGS. 10A-10B illustrate an exemplary user interface that can be displayed on a client computing device to receive a signature from a user.
Figure 10B:
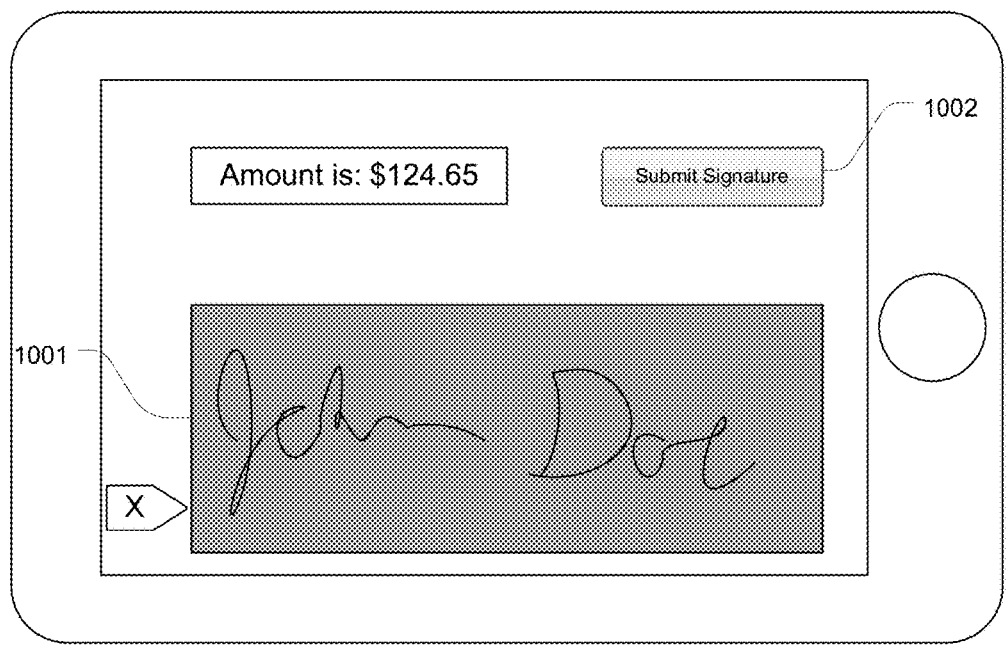

FIG. 10A illustrates a user interface 1000 that can be displayed to the user on client computing device 103 to allow the user to input a signature. User interface 1000 comprises a signature area 1001 in which the user signs his name. In some embodiments, user interface 1000 is browser based. Because a browser based approach can be used, client computing device 103 does not need any additional software beyond what is typically included in such devices (e.g. a standard browser) to input a signature. User interface 1000 can also include other information beyond what is shown in FIGS. 10A and 10B. For example, user interface 1000 can include free form text provided in the request received from merchant computing system 102.

In some embodiments, signature area 1001 can be configured to appear as a check, receipt, document, or other instrument which a user may sign to provide authorization for some action. For example, if the user is providing authorization to make periodic deductions from his checking account, the signature area 1001 can appear as a check having the user's bank routing number and account number. In such cases, the account information (e.g. bank routing number, checking account number, credit card number, other account number or identifier, transaction amount, action to be authorized, etc.) to be displayed within signature area 1001 can be provided by merchant computing system 102 (whether prior to or with the request for user input) to allow server system 101 to generate the appropriate display.

Once the user has input his signature as shown in FIG. 10B, he can select the process button 1002 which captures the signature and causes the signature to be sent back to server system 101 which routes the signature back to merchant computing system 102 (e.g. as a SOAP response). In a typical implementation, a user inputs his signature using his finger on the touch screen. However, the user can also input his signature in other ways such as by using a stylus, mouse, or other input device.

Once merchant computing system 102 has received the signature of the user, merchant computing system 102 can route the appropriate information to a third party payment processor (e.g. a clearinghouse). Also, a receipt or other evidence of the submission of the signature/input can be provided back to the client computing device 103 via any communication means (e.g. email, text, social media communication, etc.). This receipt can act as a confirmation to the user that the user provided the requested input.

In some embodiments, user interface 800 can generate a display of a check, credit card receipt, or other instrument to represent a transaction to be performed. For example, FIG. 11 illustrates that user interface 800 has been updated to include an image of a check 1101. The image of the check can be generated based on the information input into fields 801. For example, when the employee selects the request signature button 804, the information input into field 801 can be accessed to populate the routing number, account number, check number, etc. into the image of the check.

In some embodiments, the image of the check (or other type of image such as a credit card receipt) can be generated by server system 101 using the information input into field 801, and returned to merchant computing system 102 for display within user interface 800. In this manner, the logic required to implement user interface 800 on merchant computing system 102 can be further simplified, and can even allow user interface 800 to be browser based.

FIG. 12 illustrates user interface 800 when a signature is being requested to authorize a credit card transaction. As shown, user interface includes an image of a credit card receipt 1201 that includes a portion of the credit card number, the expiration date, the amount, etc.

FIGS. 13 and 14 illustrate user interface 800 after the signature has been received to authorize a check and credit card transaction respectively. As shown in each figure, the signature has been added to user interface 800 to indicate to the employee that the user's signature has been received, and the transaction is ready to be submitted to the third party payment processor. As shown in FIG. 13, the signature can be added directly to the image of the check on the signature line as if the user had directly signed the check. Similarly, in FIG. 14, the signature is shown as having been added to the receipt. A process eCheck button 1102 and a process credit card button 1202 can also be provided for submitting the information once a valid signature has been obtained.

Although the above examples of obtaining a signature have related to financial transactions, the present invention can equally be used to obtain a signature for any type of transaction or for any other purpose. For example, the present invention can be used by a courier service such as FedEx or UPS to obtain a signature to authorize a package to be left on a person's doorstep even when the person is not home. Similarly, the present invention can be used to obtain a consent from a user for any other purpose. In other words, with only an identifier of a user (e.g. phone number, email address, social networking identifier, etc.), a merchant can make a request, via server system 101, for a signature for any purpose.

For example, a courier service could use server system 101 to make batch requests for signatures to approve of leaving packages at customers' doors. When an approval is received from a customer, the approval can be routed to a delivery person to inform the delivery person that the corresponding package can be left at the door. Similarly, server system 101 can be used to make batch requests for authorizations to charge customers' accounts for a service. As each authorization is received, the corresponding account can be charged.

Further, although the above description uses the example of obtaining a signature from a user, the present invention can also be used to receive other input from a user. For example, if a merchant requires that a user input a pin or other confirmation input, the present invention can be used to send a request for such input. In such cases, rather than (or in addition to) displaying signature area 1001 when the user selects the link on client computing device 103, another area can be displayed for receiving the desired input (e.g. a form for entering a password, pin, or other identifier, or a button or other UI element for providing confirmation).

Figure 15:
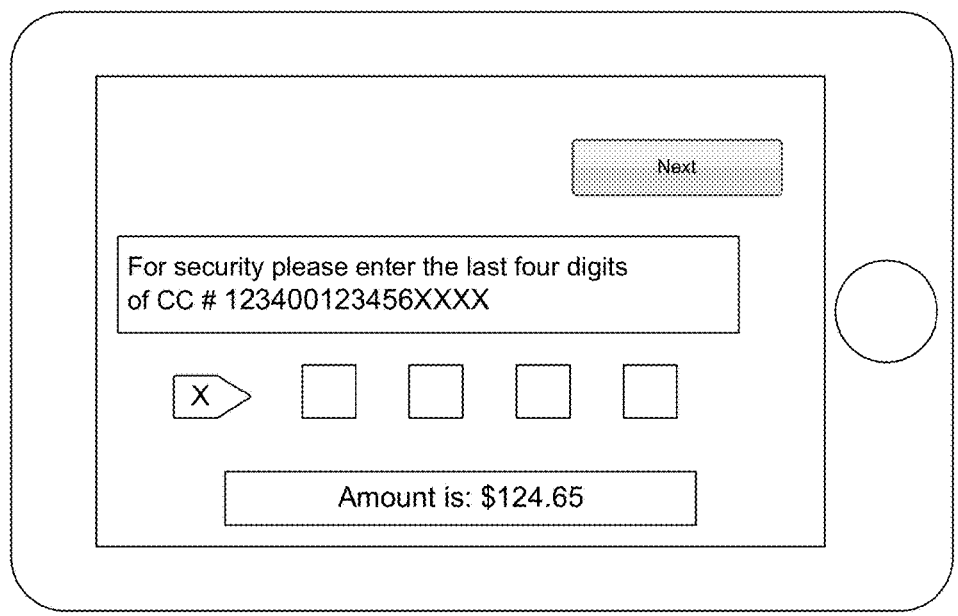
FIG. 15 illustrates an exemplary authentication user interface that can be displayed on a client computing device to perform user authentication.

FIG. 15 illustrates how server system 101 can require authentication prior to providing a signature user interface to client computing device 103. For example, after the user selects the link included in the message (e.g. text message 901), server system 101 can cause authentication user interface 1500 to be displayed to the user. Authentication user interface 1500 can include sufficient information to identify the transaction for which the user is providing his signature.

Authentication user interface 1500 can prompt the user to provide authenticating information to authenticate the user. As shown, authentication user interface 1500 can prompt the user to provide the last four digits of the routing number of the user's checking account. Other types of authenticating information can also be requested such as other account information (e.g. a pin, last four digits of credit card number, a portion of a tracking number for a package, etc.), personal information (e.g. the user's birth date or social security number), etc.

Authentication user interface 1500 can provide the benefit of ensuring that the user receiving the message from server system 101 is the intended recipient. For example, if the employee of the merchant input appropriate account information into fields 801 of user interface 800, but mistyped the phone number or email address into fields 802, 803 (thereby causing the message to be sent to an incorrect recipient), authentication user interface 1500 can successfully prevent an unintended recipient from authorizing a transaction.

Server system 101 can be configured to notify merchant computing system 102 of a failure in the authentication process to allow the merchant to verify the information input to user interface 800 and resend a request if necessary. For example, the failure notification can be sent after a specified number of failed attempts by the user to input appropriate information to authentication user interface 1500, after a specified duration of time without receiving authentication information, etc.

In some embodiments, authentication user interface 1500 can also include means for the user to notify merchant computing system 102 that the signature request has been sent to the incorrect user or that the displayed information is incorrect. For example, a button, field, or other user interface element can be included that allows a user to send a notification back to merchant computing system 102 without providing a signature.

In some embodiments, to facilitate the use of the present invention, user interface 1000 for receiving a user signature and authentication user interface 1500 for authenticating a user can be provided within a standard web browser. In other words, these user interfaces can be browser based such that no additional hardware or software is required to be installed on client computing device 103 to provide a signature remotely.

To enhance the security of the user's information and signature, the present invention can employ encryption techniques to secure the information transmitted between the various computing systems. For example, the signature captured by client computing device 103 can be transmitted securely from client computing device 103 to server system 101 such as by using HTTPS or another secure protocol. Also, the signature or other user information can be stored on server system 101 as a secure token using AES 256 encryption or another type of encryption.

Accordingly, the present invention facilitates obtaining a signature from a remote user. Any network connected client computing device having a touch screen and a browser can be used to provide a signature remotely to authorize a transaction. In this manner, a signature can be provided for transactions requiring a signature as well as for transactions were a signature is desired but not required.

By providing a browser based solution for obtaining a signature, no additional software or hardware is required to be installed on a client computing device. For example, a typical client computing device can receive a text message or email which provides a link to a web page in which the signature can be input.

The present invention further simplifies the signature obtaining process by providing an interface (e.g. a SOAP interface) that any third party merchant can access to send requests for signatures. In other words, if a merchant desires to obtain signatures from remote users over the internet, the merchant need only adapt its business processes to the interface provided by server system 101 to make and receive appropriate SOAP requests and responses. Of course, SOAP is one particular way of implementing the present invention, but other protocols could also be used in a similar manner.

Additional Features to Enhance the Authenticity of User Input

In some embodiments, it may be desirable to increase the amount of information obtained from the user to ensure the identity of the user which can be beneficial in minimizing the occurrence of fraud. For example, in addition to or in place of the authenticating information described with reference to FIG. 15 above, the present invention can obtain a location of the user, a picture of the user or of the user's identification card, or biometric information of the user.

In some embodiments, client computing device 103 can be used to obtain the location of the user while the user provides his signature or other requested input. For example, in GPS-enabled devices, GPS coordinates can be obtained and returned to server system 101 and/or merchant computing system 102 with the user's signature. When the user's location is provided with the user's signature, the location can be used to assess a strength of the authenticity of the user's signature. For example, if the user's location received with the user's signature is the same as the user's home address (which may be known by merchant computing system 102), there can be a high level of confidence in the authenticity of the user's signature (i.e. because it is highly unlikely that someone other than the user would have the user's computing device, possibly know the user's authenticating information, and be located at the user's residence).

In some embodiments, the user can be requested to take a picture of himself or of his identification card and include the picture with the signature or other input returned to merchant computing system 102. For example, when the user is asked to provide a signature or other input to authorize the merchant to perform an action, the user can also be asked to take a picture of himself (e.g. using a camera of client computing device 103). The picture of the user can be returned to server system 101 and/or merchant computing system 102 to be used as additional proof of the authenticity of the user's signature or other input.

In embodiments where a picture of the user is obtained, the system can be configured to collect and store pictures of each registered user of the system. In this way, when a particular user provides a picture in conjunction with user input, the provided picture can be compared to the picture stored for the user. For example, the two pictures can be displayed to an employee of the merchant for comparison prior to accepting the user input as authorization. Even if a picture is not stored for a user, a picture can still be requested and used to enhance the authenticity of user input such as by ensuring that the picture is of a person having the expected age, race, gender, etc. In some embodiments, the process of verifying a picture can be automated using facial recognition software.

In some embodiments, the user can be requested to take a picture of his identification card such as a driver's license or other form of identification. The picture of the identification card can be processed to retrieve information such as by performing optical character recognition (OCR) to obtain a user's name, birthdate, or address from the picture of the identification card. Any obtained information can be added to a user's account or compared to already-known information about the user. In some embodiments, a photo contained on the user's identification card can also be processed in a manner similar to a picture directly taken by the user as described above. In some embodiments, the user can be requested to provide a picture of himself in addition to a picture of the user's identification card. In such cases, a comparison of the two pictures can serve to verify the identity of the user.

Pictures can also be used to enhance the identity verification process by accessing metadata of the pictures. For example, many devices generate metadata when a picture is taken. This metadata can define a location where the picture was taken such as the GPS coordinates of a phone when the phone takes the picture. In some embodiments when a picture is submitted as part of the authentication process, the system can compare the location where the picture was taken as defined in the metadata of the picture to the current location of the client computing device.

If the locations do not match, or are not within a specified distance, the system can identify that the user of the client computing device may be an unauthorized user. For example, if an unauthorized user obtained a picture of the user (or the user's ID) and attempted to use the picture of the user to authenticate with the system as the user, and if the unauthorized user attempted to authenticate using the picture at a location that differed from the location where the picture was taken, the system can detect the differences in the two locations and can cause the authentication to fail. In this way, the system can ensure that the picture submitted for authentication is taken at the same location as the user's location during authentication.

In addition to location metadata, other metadata of a picture can also be used to enhance the identity verification process. For example, a timestamp of the picture can be used to ensure that the picture is taken at the same time as the authentication process. In such cases, the system may compare the timestamp of the picture to the time when the picture is submitted to ensure that the times are within a specified period. Requiring the picture to be taken at the same relative time as authentication can minimize the possibility that an unauthorized user can obtain a picture of the user (or the user's ID) that will pass authentication.

The picture metadata can also be used to identify whether the picture has been altered. For example, an unauthorized user may attempt to modify a picture so that the modified picture will pass authentication (e.g. modifying a picture to appear more similar to the user). The system can identify metadata indicating that a picture has been altered and can potentially cause the authentication to fail.

As another example, metadata describing the device that took the picture can be used to ensure that the same device used for authentication/authorization is used to take the picture. In short, the system can analyze many different types of picture metadata to enhance the identity verification process when pictures are used.

In some embodiments, biometric information of the user can be obtained using client computing device 103 and sent with the user's signature or other input. For example, client computing device 103 can be configured to perform a fingerprint, face, iris, or retina scan. The obtained scan can serve as verification of the user's identity (e.g. by comparing the obtained scan to a stored scan) when providing the signature or other input as authorization for the merchant to perform some action.

In some embodiments, the authenticity of the user's signature can be verified by comparing a received signature to a stored signature for the user. To enable this type of signature verification, in some embodiments, the above described approach for remotely obtaining a user's signature can be used to obtain a copy of the user's signature to store for later comparison. For example, when a user registers to use the system of the present invention, a request can be sent to the user to provide a signature as described above. This initial signature can be received and stored for later comparison when the user desires to provide remote authorization using his signature. For example, when a merchant desires to receive the user's authorization to perform an action, the user's signature can again be obtained. The newly obtained signature can be compared to the stored signature for the user. When the signatures match, the authenticity of the user can be verified.

Each of the above described approaches for increasing the authenticity of the user's signature or other input can be used alone or in combination with another approach. For example, the user can be prompted to input some form of authenticating information (e.g. account information, social security number, etc.) in addition to providing a picture or scanning his fingerprint. Similarly, the location of the user can be included when the user also provides a picture of his driver's license.

In some embodiments, the specific approach for authenticating the user can be a merchant selectable feature. For example, if the merchant desires a high level of confidence in the authenticity of the user input (e.g. when the user is providing authorization for a high value/risk transaction), the merchant can specify in its request to server system 101 that the user provide a biometric scan or multiple levels of authenticating information. Accordingly, in such embodiments, the merchant can control the amount of authentication the user must perform in order to provide authorization remotely using the user's signature or other input.

Figure 18:
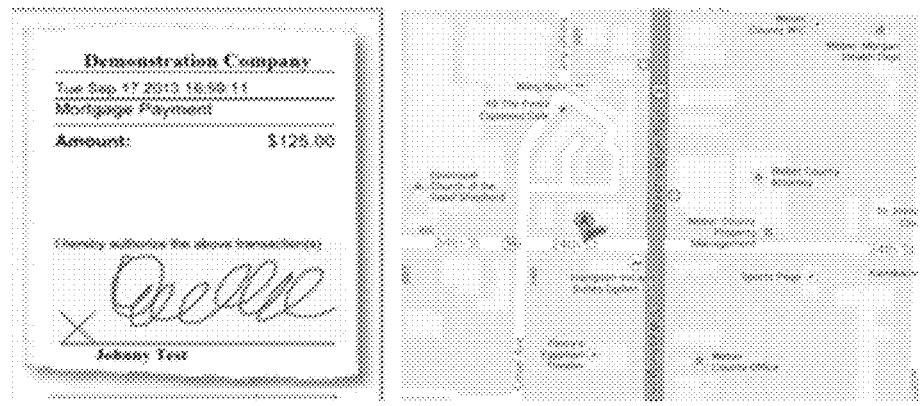
FIG. 18 illustrates an example audit report.

In some embodiments, an audit report can be created for each signature received using the above described process. Depending on the type of authentication that is employed, an audit report can include the signature (or other type of authorization input), the contact information used to send the signature request to the user, the location of the device when the signature was provided (including a map view and/or street view of the location), the time/date when the signature was provided, the shared secret question presented and answer provided, contact information used to send a receipt, a picture of the user or of the user's identity card, biometric information, etc. FIG. 18 illustrates an example of an audit report that can be generated.

An audit report can be provided to the user and/or the merchant as evidence that the user provided authorization for a transaction. For example, if a user, after providing authorization, claimed to have not authorized a transaction, the merchant could provide the audit report to the user to challenge his claim.

Obtaining Account Information and Authorization Via a Single User Interface

The above described techniques for receiving a user's account information using overlaid input fields can be employed in the process of receiving authorization. For example, in addition to requesting a user's signature as described above, a merchant can also request that the user input his payment information. The user interface displayed to the user to receive the payment information can include overlaid input fields so that the payment information is securely transferred to server system 101 without being stored on client computing device 103.

Figure 16A:
FIGS. 16A and 16B illustrate example user interfaces that can be displayed during an authorization process to receive payment information using overlaid input fields.
Figure 16B:

To accomplish this, prior to (or in conjunction with) displaying a signature area such as signature area 1001 shown in FIG. 10A, a user interface can be displayed that contains overlaid input fields for receiving the user's payment information. FIGS. 16A and 16B illustrate an example user interface 1600 that can be displayed for receiving credit card and bank account information respectively. In either case, user interface 1600 includes overlaid input fields 1601, 1602 to securely receive the payment information.

After the payment information has been received, a user interface having a signature area can be presented on client computing device 103 to allow the user to provide a signature (or other authorization input as described above) to authorize the merchant to use the provided payment information to perform a transaction. In some embodiments, a single user interface can be displayed that includes both overlaid input fields and a signature area or other authorization field to allow the user to provide payment information and authorization within the single user interface.

Figure 17A:
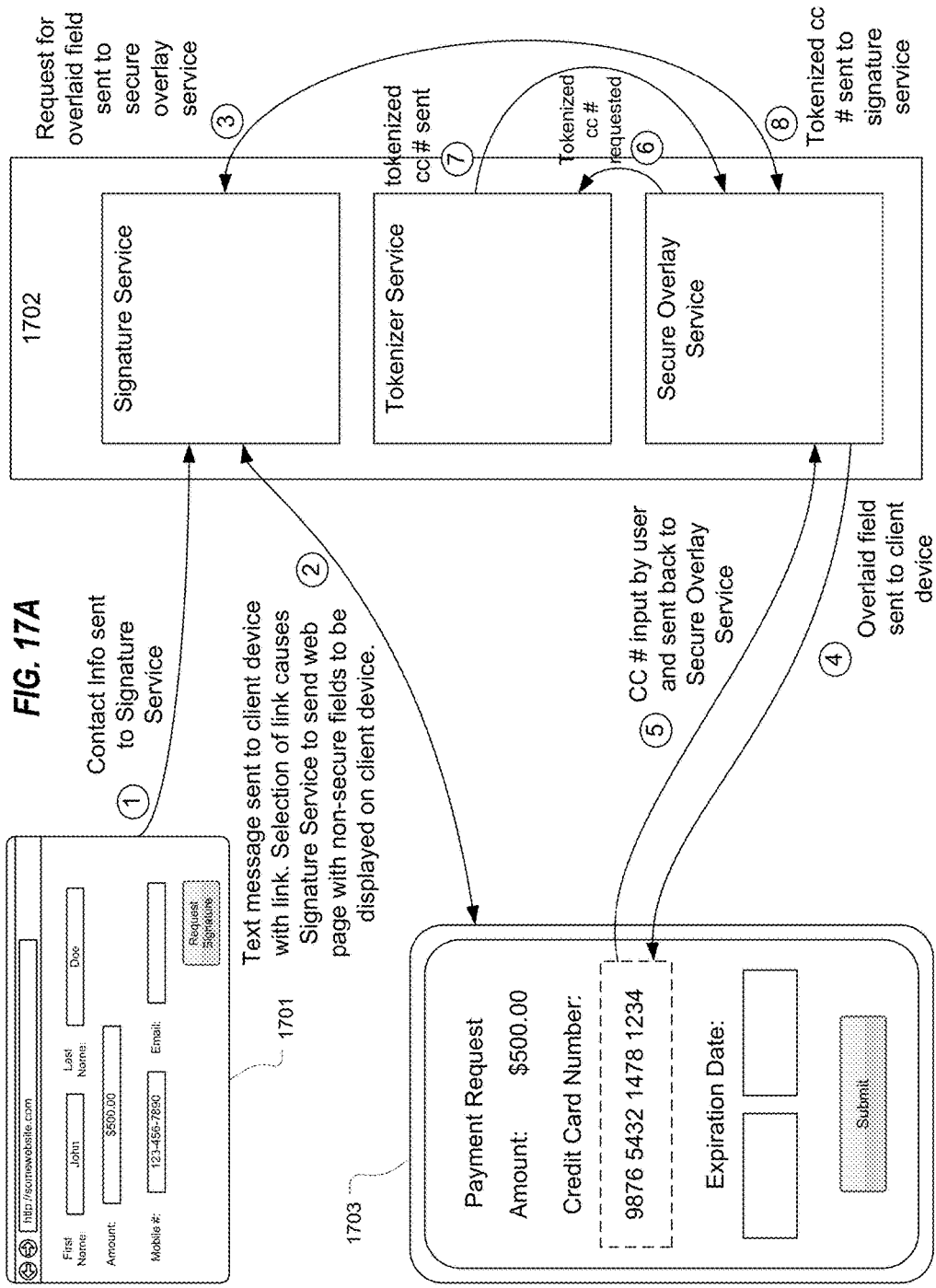
Figure 17C:
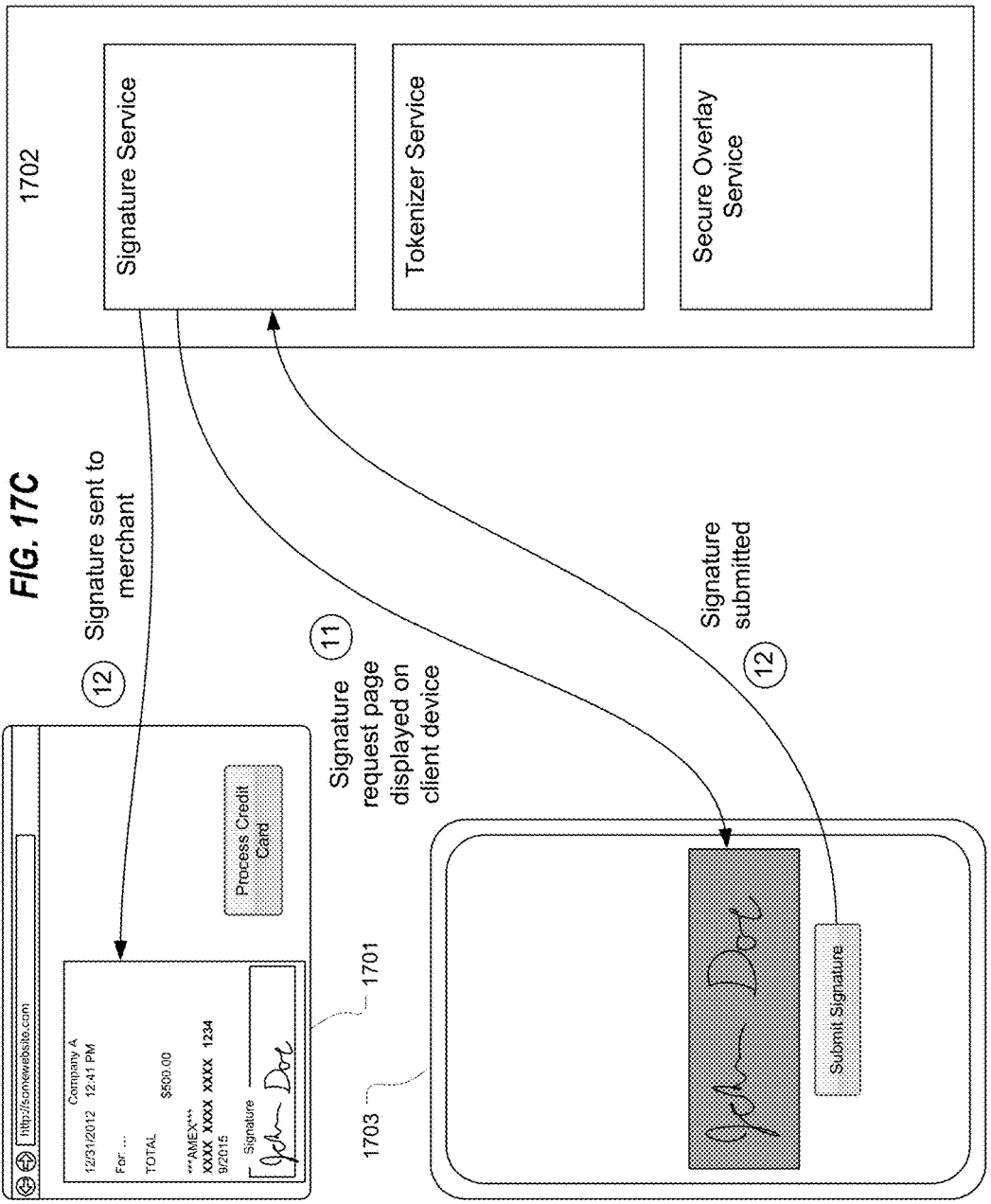

FIGS. 17A-17C provide a flow diagram that illustrates various example steps in a process for receiving payment information and authorization from a user of a remote device. The depicted process is shown as being carried out among a merchant system 1701, a server system 1702, and a client device 1703. Server system 1702 includes various services. Although these services are shown within a single server system 1702, in many cases, these services could be implemented on separate server systems. In any case, the secure overlay service and the tokenizer service (and typically a credit card/ACH processing service (not shown)) are implemented in a secure environment. In this way, the merchant system, the client device, and the signature service do not need to be secure environments thereby facilitating the receipt of payment information from any client device.

The services can represent any suitable application or component for providing the recited functionality. In some embodiments, the services can include web services. In such cases, the web services may communicate with or employ other components or constructs for providing desired functionality. In one example, a web service can employ a model-view-controller (MVC) for handling the generation of user interfaces for display on client device 1703 and/or merchant system 1701. As one of skill in the art would understand, other web architectures or components could equally be used. Therefore, the present invention should not be limited to any specific type of components that are selected to provide the recited functionality.

The steps of the example process of obtaining payment information and authorization are described as follows. In this example, the payment information is a credit card and the authorization is in the form of a signature. However, any of the above described forms of payment information and authorization can equally be obtained using this process.

1) Merchant system 1701 inputs contact information of a user and an amount for which payment is request. This input can be received in a user interface similar to user interface 800 shown in FIG. 8. However, unlike user interface 800, because payment information is being requested, the depicted user interface does not need to receive account information from the merchant.

2) When the signature service receives the contact information from the merchant system, the signature service sends a text message to the phone number included in the contact information. The text message can contain a link such as is shown in FIG. 9. When the user selects the link in the text message, a web page can be displayed that includes non-secure fields (e.g. fields for input that does not require a PCI DSS compliant environment). This step can optionally include a request for the user to authenticate prior to receiving the web page.

3) In conjunction with sending the web page with the non-secure fields, the signature service requests that the secure overlay service generate secure overlaid fields to be displayed overtop the web page with the non-secure fields.

4) The secure overlay service sends the secure overlaid field to the client device which displays the secure overlaid field overtop the web page received from the signature service. In this example, a single secure overlaid field is shown for receiving the credit card number. However, more than one secure overlaid field can be used for receiving other input from the user in a secure manner. For example, an overlaid field can be used to receive the security code for the credit card or any other sensitive input.

5) When the user inputs the credit card number into the secure overlaid field, the credit card number is securely transferred back to the secure overlay service. Because the credit card number is not stored on the client device and it is securely transferred from the overlaid field to the secure overlay service which is operating in a secure environment, the receipt of the credit card number can be accomplished in compliance with any of the various standards for processing payment or other sensitive information.

6) The secure overlay service sends the credit card number to the tokenizer service to request that the credit card number be tokenized.
7) The secure overlay service receives back a tokenized credit card number (e.g. an alphanumeric representation of the credit card number that is independently meaningless).
8) The secure overlay service sends the tokenized credit card number to the signature service.
9) The signature service updates the webpage with the non-secure fields to include a representation of the credit card number (which may be the tokenized credit card number).
10) The user inputs the credit card expiration date (which is not secure content) and submits the payment request to the signature service.
11) The signature service sends a signature request web page to the client device.
12) The user provides the signature and submits it to the signature service.
13) The signature service provides the signature and the representation of the credit card number to the merchant to allow the merchant to generate a receipt as evidence of the authorization to perform the transaction. In some embodiments, the signature service can provide the tokenized credit card number to the merchant system to allow the merchant system to process charges to the credit card (e.g. by resubmitting the tokenized credit card number to the signature service or other service) such as when the user is authorizing recurring payments. However, if the authorization is for a one-time payment, the signature service can fully process the payment so that the tokenized credit card number need not be provided to the merchant system.

After this process has been completed, the signature service can carry out the processing of the credit card payment by submitting the tokenized credit card number, the expiration, payment amount, user information, etc. to a credit card payment service. As stated above, the processing of the credit card can occur in response to a request from the merchant system or can automatically be performed upon receiving all the necessary information (e.g. after step 12). The credit card payment service, which is operating in a secure environment, can use the tokenized credit card number to request the credit card number from the tokenizer service to process the payment. Once the payment has been processed, the credit card payment service can report back to the signature service which may then send a confirmation of the payment to the client device. Alternatively, if the payment failed, the above described process can be repeated to obtain another credit card number or other information to resubmit the payment request.

In other embodiments of the above described process, fewer services can be employed. For example, the signature service can be configured to provide the functionality of the secure overlay service. In such cases, the signature service can be configured to operate in a secure environment. Similarly, the signature service can be configured to provide the functionality of the secure overlay service and the tokenizer service. In other words, the specific manner in which the functionality is divided among services is not essential to the invention. In any case, the process allows the merchant to obtain payment information from a client device without the merchant or the client device needing to operate in a secure environment.

Although the above description has related primarily to the receipt of payment information, other sensitive information could be received in a similar manner. For example, the above described techniques could be used to obtain a user's social security number and authorization to perform some transaction requiring the social security number. Accordingly, the present invention should not be limited to obtaining any particular type of information.

Further, the above description describes the process as being carried out using separate merchant and server computing systems. However, the present invention can also be carried out when the merchant and server computing systems are the same or share similar components. For example, a merchant can employ a server system to directly provide the described functionality. In other words, a third party server system does not need to be employed in all embodiments of the invention. In some cases, the merchant computing system and server computing system can be viewed as software constructs that are executed on the same or similar hardware (e.g. a cloud-based implementation). In any case, the present invention enables a merchant to make a request to receive sensitive information and authorization to use the sensitive information from a user of a client device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a server computing environment, a method for enabling a merchant computing system to obtain payment information from a user, the method comprising:
    providing an interface to the merchant computing system, the interface configured to receive communications from an application executing on the merchant computing system, the server computing system comprising memory that stores computer executable instructions defining the interface and a processor that executes the computer executable instructions to provide the interface;
    receiving, via the interface, one or more first communications sent over the internet by the application executing on the merchant computing system, the one or more first communications including:
        (1) a request to obtain payment information from the user to be used to make a payment,
        (2) a request to obtain user input to serve as authorization to make the payment,
        (3) an amount for which payment is requested, and
        (4) contact information for the user;
    extracting the contact information and the amount for which payment is requested from the one or more first communications;
    generating a first webpage that specifies the amount for which payment is requested;
    formatting the first webpage to include one or more secure overlay fields for receiving the payment information in a secure manner;

generating a second webpage that includes an input area for receiving the user input to serve as authorization to make the payment;

transmitting a second communication over a network to a client computing device associated with the user based on the contact information that was provided in the one or more first communications, the second communication including a link which the user can select to cause the first and second webpages to be displayed;

in response to the user selecting the link included in the second communication, transmitting the first and second webpages to the client computing device;

in response to the user providing the payment information into the one or more secure overlay fields, receiving one or more third communications that include the payment information, the one or more secure overlay fields causing the one or more third communications to be received in a secure manner;

in response to the user providing the user input to serve as authorization to make the payment into the input area of the second webpage, receiving one or more fourth communications that includes the user input; and sending the user input to the merchant computing system to enable the merchant computing system to associate the user input with the payment.

2. The method of claim 1, wherein the one or more secure overlay fields are configured to transmit the one or more third communications to a service executing in a secure environment.

3. The method of claim 2, wherein the one or more fourth communications are received by a service that is not executing in a secure environment.

4. The method of claim 3, further comprising:
receiving, by the service that is not executing in the secure environment, a token from the service executing in the secure environment, the token representing the payment information.

5. The method of claim 4, further comprising:
updating the display of the first webpage to include a representation of the token.

6. The method of claim 1, wherein the second webpage is displayed after the first webpage.

7. The method of claim 1, wherein the first webpage also includes one or more fields for receiving a portion of the payment information in an unsecure manner.

8. The method of claim 7, wherein the payment information received into the one or more secure overlay fields comprises a credit card number and the portion of the payment information received in the one or more fields comprises an expiration date for the credit card number.

9. The method of claim 4, wherein the service executing in the secure environment is executed on a different server computing device than the service that is not executing in the secure environment.

10. The method of claim 4, further comprising:
sending the token to the merchant computing system.

11. The method of claim 10, wherein the payment is a recurring payment, the method further comprising:
receiving, from the merchant computing system, a request to make a recurring payment, the request including the token;
employing the token to obtain the payment information; and
processing the recurring payment using the payment information.

12. The method of claim 1, further comprising:
processing the payment using the payment information.

13. In a server computing environment, a method for enabling a merchant computing system to obtain payment information from a user, the method comprising:

providing an interface to the merchant computing system, the interface configured to receive communications from an application executing on the merchant computing system, the server computing system comprising memory that stores computer executable instructions defining the interface and a processor that executes the computer executable instructions to provide the interface;

receiving, via the interface, one or more first communications sent over the internet by the application executing on the merchant computing system, the one or more first communications including:
(1) a request to obtain payment information from the user to be used to make a payment,
(2) a request to obtain user input to serve as authorization to make the payment,
(3) an amount for which payment is requested, and
(4) contact information for the user;

extracting the contact information and the amount for which payment is requested from the one or more first communications;

generating, by a first service, a first webpage that specifies the amount for which payment is requested;

formatting the first webpage to include one or more secure overlay fields for receiving the payment information, the one or more secure overlay fields being configured to route the payment information to a second service that is executing in a secure environment;

generating a second webpage that includes an input area for receiving the user input to serve as authorization to make the payment, the second webpage being configured to route the user input to the first service;

transmitting a second communication over a network to a client computing device associated with the user based on the contact information that was provided in the one or more first communications, the second communication including a link which the user can select to cause the first and second webpages to be displayed;

in response to the user selecting the link included in the second communication, transmitting the first and second webpages to the client computing device;

in response to the user providing the payment information into the one or more secure overlay fields, receiving, by the second service, one or more third communications that include the payment information, the one or more secure overlay fields causing the one or more third communications to be received in a secure manner;

receiving, by the first service, a token from the second service, the token representing the payment information;

in response to the user providing the user input to serve as authorization to make the payment into the input area of the second webpage, receiving, by the first service, one or more fourth communications that includes the user input; and sending the user input to the merchant computing system to enable the merchant computing system to associate the user input with the payment.

14. The method of claim 13, further comprising:
updating the first webpage to include a representation of the token.

15. The method of claim 13, further comprising:
sending the token to the merchant computing system.

16. The method of claim 13, further comprising:
processing the payment using the payment information.

17. The method of claim 13, wherein the first webpage is transmitted to the client computing device prior to the second webpage.

18. The method of claim 13, wherein the first and second services are executed on the same server system.

19. The method of claim 13, wherein the one or more secure overlay fields are configured to transmit the one or more third communications using HTTPS.

20. The method of claim 13, further comprising:
transmitting a third webpage to the client computing device prior to transmitting the first or second webpages, the third webpage including one or more fields for inputting authenticating information to be used to authenticate the user.

21. The method of claim 13, further comprising:
receiving authenticating information from the client computing device.

* * * * *